(12) United States Patent
Choi

(10) Patent No.: US 9,191,418 B2
(45) Date of Patent: Nov. 17, 2015

(54) METHOD AND TERMINAL FOR APPLYING BACKGROUND SKIN IN INTERNET PROTOCOL NETWORK

(75) Inventor: Hang-Rak Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2266 days.

(21) Appl. No.: 11/604,287

(22) Filed: Nov. 27, 2006

(65) Prior Publication Data

US 2007/0153083 A1    Jul. 5, 2007

(30) Foreign Application Priority Data

Jan. 2, 2006    (KR) ........................ 10-2006-0000236

(51) Int. Cl.
*H04L 12/66* (2006.01)
*H04L 29/06* (2006.01)
*H04L 29/08* (2006.01)

(52) U.S. Cl.
CPC ...... *H04L 65/1069* (2013.01); *H04L 29/06027* (2013.01); *H04L 67/14* (2013.01)

(58) Field of Classification Search
None
See application file for complete search history.

(56) References Cited

U.S. PATENT DOCUMENTS

| 6,766,007 | B1 * | 7/2004 | Dermler et al. ........... 379/201.01 |
| 7,227,567 | B1 * | 6/2007 | Beck et al. ................. 348/14.07 |
| 7,283,273 | B2 * | 10/2007 | Izumi et al. .................. 358/1.15 |
| 2002/0094806 | A1 * | 7/2002 | Kamimura ................... 455/415 |
| 2002/0132610 | A1 * | 9/2002 | Chaplin et al. .............. 455/414 |
| 2002/0159634 | A1 * | 10/2002 | Lipton et al. ................. 382/173 |
| 2003/0023730 | A1 * | 1/2003 | Wengrovitz et al. .......... 709/227 |
| 2004/0032906 | A1 * | 2/2004 | Lillig ....................... 375/240.08 |
| 2004/0145654 | A1 * | 7/2004 | Motohashi ................. 348/14.02 |
| 2006/0083244 | A1 * | 4/2006 | Jagadesan et al. .......... 370/395.2 |
| 2008/0030621 | A1 * | 2/2008 | Ciudad et al. ................ 348/586 |

FOREIGN PATENT DOCUMENTS

| EP | 1 024 643 | 8/2000 |
| EP | 1 298 933 | 4/2003 |
| KR | 10-2001-0107100 | 12/2001 |
| KR | 10-2004-0079459 | 9/2004 |

OTHER PUBLICATIONS

Korean Office Action for Korean Patent Application No. 10-2006-0000236 issued on Nov. 24, 2006.

* cited by examiner

*Primary Examiner* — Faruk Hamza
*Assistant Examiner* — Aixa Guadalupe-Cruz
(74) *Attorney, Agent, or Firm* — H.C. Park & Associates, PLC

(57) ABSTRACT

In a method and apparatus for applying a background skin in an Internet protocol (IP) network, a first terminal sends a call request message, including background skin index information, to a second terminal. The second terminal sends a response message, including background skin index information, to the first terminal in response to the received call request message. The first terminal and the second terminal separately receive and display background skin data transmitted between the first terminal and the second terminal, and display multimedia data transmitted and received during a session established between the first terminal and the second terminal, together with the background skin displayed on each terminal.

22 Claims, 7 Drawing Sheets

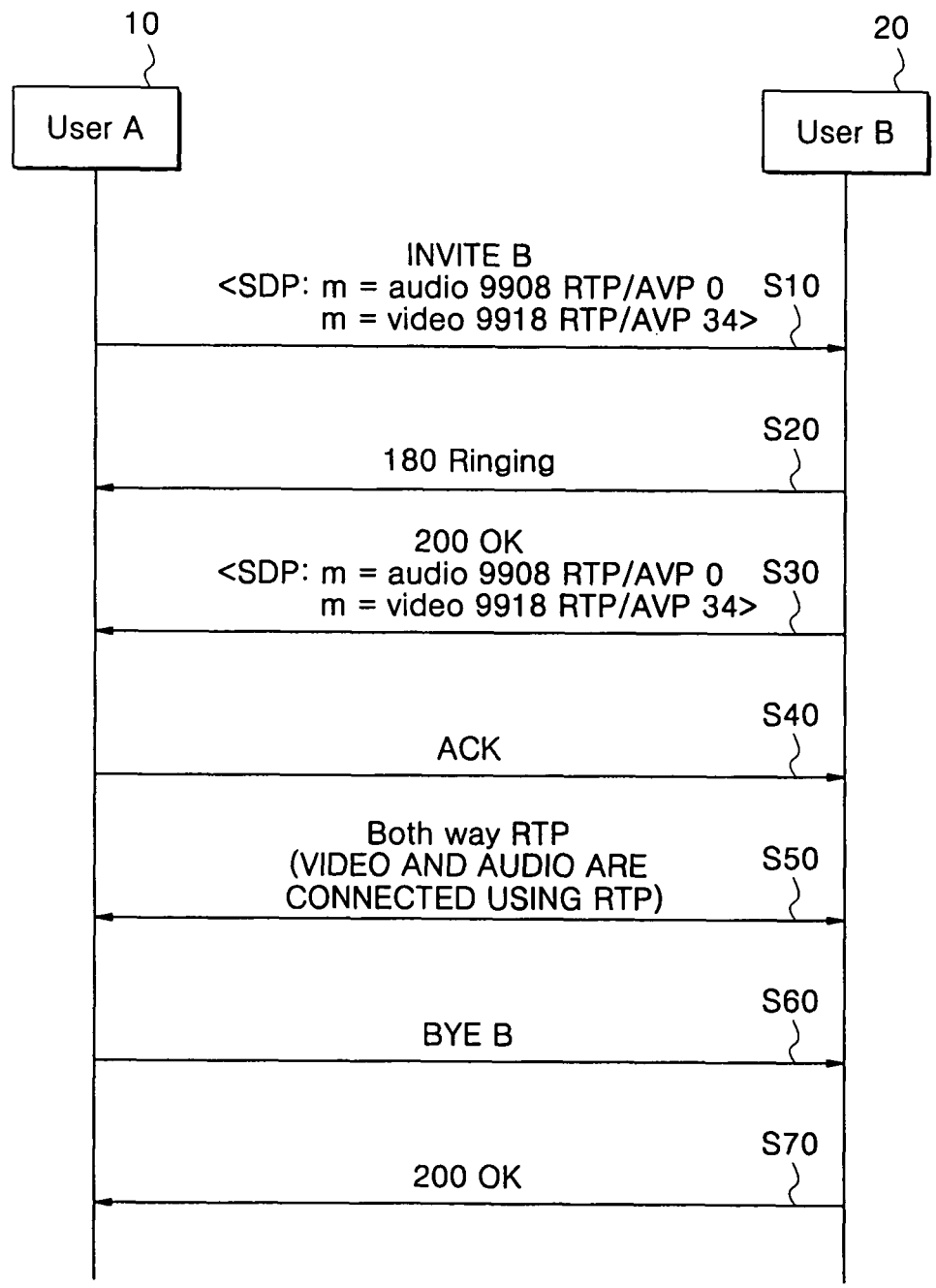

FIG. 5
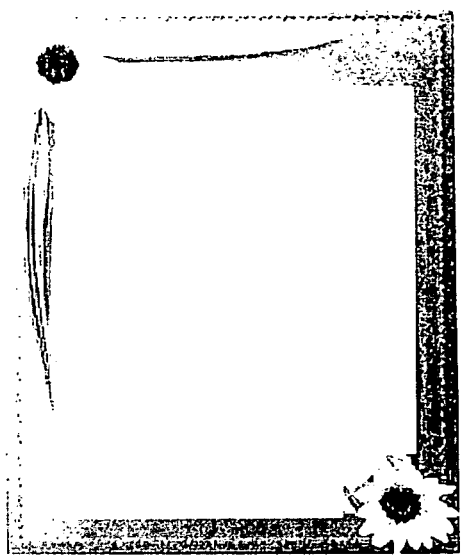
(background skin 01)
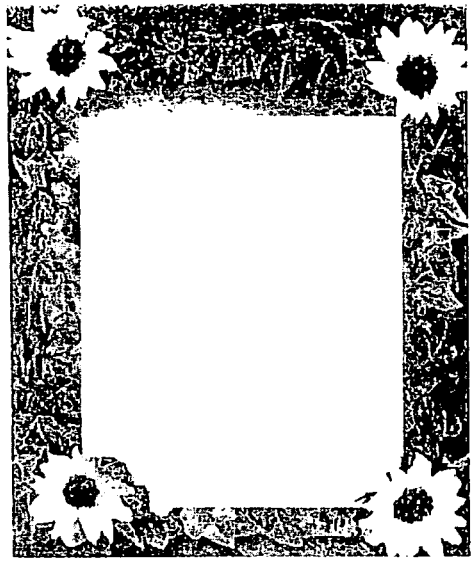
(background skin 02)
FIG. 6A

METHOD AND TERMINAL FOR APPLYING BACKGROUND SKIN IN INTERNET PROTOCOL NETWORK

CLAIM OF PRIORITY

This application makes reference to, incorporates the same herein, and claims all benefits accruing under 35 U.S.C.§119 from an application for BACKSKIN SERVICE METHOD AND DEVICE IN INTERNET PROTOCOL NETWORK earlier filed in the Korean Intellectual Property Office on the 2 Jan. 2006 and there duly assigned Serial No. 10-2006-0000236.

BACKGROUND OF THE INVENTION

1. Field of the Invention

The present invention relates to a method and apparatus for applying a background skin in an Internet protocol (IP) network.

2. Description of the Related Art

Voice over Internet protocol (VoIP) is a new type of communication technology enabling vocal conversation over an IP network instead of the conventional public switched telephone network (PSTN).

Since communication via a packet-based IP network incurs no telephone charges, voice calls using VoIP are inexpensive.

VoIP enables transmission of video information as well as audio information using H.323 protocol, which is an International Telecommunication Union-Telecommunication standardization sector (ITU-T) standard. In the latter regard, the H.323 protocol is made by the ITU in order to provide a multimedia communication service between networks in real time.

As described above, the VoIP service can be implemented using various protocols. The simplest type of VoIP service sets up a connection between two endpoints using session initiation protocol (SIP), and transmits real-time transport protocol (RTP) packets between the two endpoints through the connection point, thereby allowing a conversation.

The SIP, corresponding to the H.323 of ITU-T, is a signaling protocol used when a session is established. The SIP can be used for connecting a video call, multimedia, and even online games, besides providing a conventional VoIP service between terminals or users.

SIP is a very simple text-based application-layer control protocol, and enables at least two participants to establish, modify, and terminate a session. Such sessions can include a teleconference, a call, an interview, event information, and instant messaging using the Internet. SIP is independent of packet protocols, i.e., transmission control protocol (TCP), user datagram protocol (UDP), asynchronous transfer mode (ATM), and X.25, in a lower layer thereof.

When a user has a video conversation using SIP, the display screens of the transmitting terminal and the receiving terminal display only the image of the user and his/her counterpart at the other end. Such a simplistic display may bore the conversing users. Therefore, there is a need for a method for enhancing the visual appeal of video conversations to make them more interesting and personal for the conversing users.

SUMMARY OF THE INVENTION

It is an object of the present invention to provide a method and apparatus for applying a background skin in an Internet protocol (IP) network, the method and apparatus being capable of providing a background skin during a video conversation between users to display an interesting and personalized call screen.

A first aspect of the present invention provides a method for applying a background skin in a video call service, the method comprising the steps of: sending, at a first terminal, a call request message including background skin index information to a second terminal; sending, at the second terminal, a response message including background skin index information to the first terminal in response to the received call request message; receiving and displaying, separately at the first terminal and the second terminal, background skin data transmitted between the first terminal and the second terminal; and displaying multimedia data transmitted and received during a session established between the first terminal and the second terminal together with the background skin displayed on each terminal.

The background skin index information is preferably included in the call request message having audio data information or video data information.

The background skin data may be set up and stored according to each contact in a phonebook of each terminal.

The background skin data transmitted between the first terminal and the second terminal may be transmitted using transmission control protocol (TCP).

The step of displaying multimedia data together with the background skin preferably further comprises the step of, when the background skin is intended to be changed, sending a re-call request message, including index information of a new background skin, and a response message between the first terminal and the second terminal.

The method preferably further comprises the step of receiving and displaying new background skin data transmitted between the first terminal and the second terminal.

The method preferably further comprises the step of displaying multimedia data transmitted and received between the first terminal and the second terminal together with the background skin newly displayed on each terminal.

A second aspect of the present invention provides a method for applying a background skin in a video call service, the method comprising the steps of: displaying multimedia data transmitted and received during a session established between a first terminal and a second terminal, together with a background skin displayed on each terminal; sending a re-call request message, including index information of a new background skin intended to be substituted, and a response message, between the first terminal and the second terminal; receiving and newly displaying new background skin data transmitted between the first terminal and the second terminal; and displaying multimedia data transmitted and received between the first terminal and the second terminal together with the new background skin newly displayed on each terminal.

The changed background skin index information is preferably included in the re-call request message having audio data information or video data information.

The changed background skin data transmitted between the first terminal and the second terminal may be transmitted using the TCP.

A third aspect of the present invention provides a method for applying a background skin in a video call service, the method comprising the steps of: sending, at a first terminal, a call request message including background skin index information to a second terminal; sending, at the second terminal, a response message including blank background skin index information to the first terminal in response to the received call request message; receiving and displaying background skin data transmitted from the first terminal to the second terminal; and displaying multimedia data transmitted from the first terminal during a session established between the first terminal and the second terminal, together with the background skin displayed on the second terminal.

The background skin index information is preferably included in the call request message having audio data information or video data information.

The background skin data is preferably set up according to each contact in a phonebook of the first terminal, and stored.

The background skin data transmitted from the first terminal to the second terminal may be transmitted using the TCP.

The step of displaying multimedia data together with the background skin preferably further comprises the step of, when the background skin is intended to be changed, sending by means of the first terminal a re-call request message, including index information of a new background skin, to the second terminal.

The method preferably further comprises the step of receiving and displaying, at the second terminal, new background skin data transmitted from the first terminal.

The method preferably comprises the step of displaying multimedia data transmitted from the first terminal together with the background skin newly displayed on the second terminal.

A fourth aspect of the present invention provides a wireless terminal comprising a background skin service module which receives a response message, including second background skin index information, corresponding to a call request message including first background skin index information, and which, while receiving and displaying background skin data, displays multimedia data transmitted over an established session together with the displayed background skin data.

The background skin index information is preferably included in the call request message having audio data information or video data information.

The background skin data is preferably set up according to each contact in a phonebook of a terminal, and stored.

The background skin data may be transmitted using the TCP.

When the background skin is intended to be changed while the multimedia data is displayed together with the background skin, the wireless terminal receives a response message, including fourth background skin index information, corresponding to a re-call request message including third background skin index information, and then, while receiving and displaying new background skin data, the wireless terminal displays the corresponding multimedia data together with the new background skin.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a diagram of call flow for a video call;

FIG. 5 illustrates various background skins which can be selected by a user;

FIGS. 6A and 6B illustrate examples of a screen to which a background skin selected by a user is applied;

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness.

Figure 2A:
FIGS. 2A and 2B illustrate examples of a video call screen in a videophone.
Figure 2B:

FIG. 1 is a diagram of basic call flow for a video call, and FIGS. 2A and 2B illustrate examples of a video call screen in a general videophone.

As illustrated in FIG. 1, a transmitting visual terminal 10 sends an "INVITE B" message, which is a call request message, to a receiving visual terminal 20 (S10). In this regard, session description protocol (SDP) is defined as follows: <SDP: m=audio 9908 RTP/AVP 0 m=video 9918 RTP/AVP 34>.

Subsequently, the receiving visual terminal 20 sends a "180 Ringing" message to the transmitting visual terminal 10 (S20), and then sends a "200 OK" message to the transmitting visual terminal 10 (S30). In this regard, the SDP is defined as follows: <SDP: m=audio 9908 RTP/AVP 0 m=video 9918 RTP/AVP 34>.

Subsequently, the transmitting visual terminal 10 sends an "ACK" response message to the receiving visual terminal 20 (S40).

Accordingly, the transmitting visual terminal 10 and the receiving visual terminal 20 are connected by real time protocol (RTP) (S50), and thus are allowed to exchange audio/video with each other.

In other words, as illustrated in FIGS. 2A and 2B, simple images of a receiver and a caller are displayed on conventional video call screens.

As illustrated in FIG. 2A, an image of the receiver is displayed on the screen of the caller's videophone, and an image of the caller is displayed in a corner of the screen.

Likewise, as illustrated in FIG. 2B, an image of the caller is displayed on the screen of the receiver's videophone, and an image of the receiver is displayed in a corner of the screen.

Subsequently, referring to FIG. 1, when the video call between the transmitting visual terminal 10 and the receiving visual terminal 20 is terminated, the transmitting visual terminal 10 sends a "BYE B" message which informs the receiving visual terminal 20 of the call termination (S60), and the receiving visual terminal 20 sends a "200 OK" message to the transmitting visual terminal 10 (S70).

Figure 3:
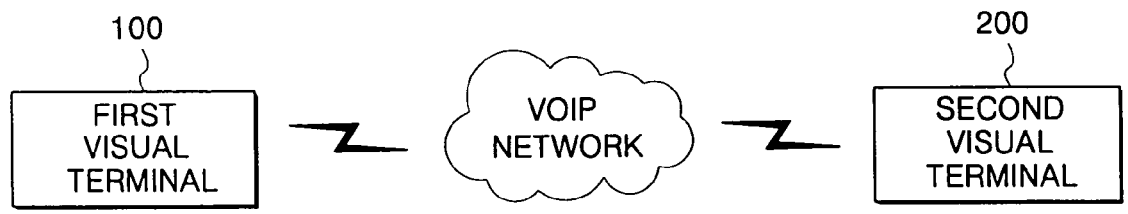
FIG. 3 is a schematic block diagram of a video telephony system according to the present invention.

FIG. 3 is a schematic block diagram of a video telephony system according to the present invention.

As illustrated in FIG. 3, the video telephony system comprises a first visual terminal 100 and a second visual terminal 200 which conduct a video call using session initiation protocol (SIP) through a voice over Internet protocol (VoIP) network. In this regard, the first visual terminal 100 is a transmitting visual terminal and the second visual terminal 200 is a receiving visual terminal.

Basically, data of at least one background skin image which can be selected by a user is stored in the first visual terminal 100 and the second visual terminal 200.

The background skin image also can be downloaded by the user and used from a server of a service provider.

The user can set up different background skins for contacts previously stored in a phonebook through a user menu provided by the terminal, and can have a video conversation to which a background skin is applied.

In particular, during a video call, the first visual terminal 100 and the second visual terminal 200 do not mix moving picture data and a background skin into one set of moving picture data to be transmitted, but rather separately transmit the background skin and the moving picture data, so that hardware for data mixing is not required.

Therefore, the present invention enables conduct of a video call to which a background skin is applied according to an SIP call flow without adding other hardware.

Figure 4:
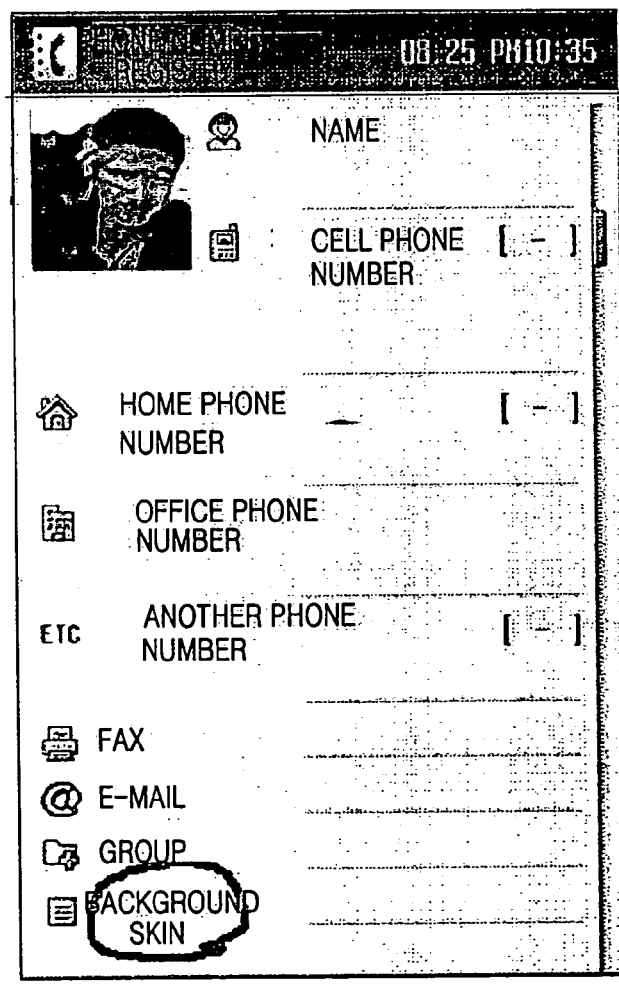
FIG. 4 illustrates an example of a background skin set-up screen according to a video conversation partner.
Figure 6B:

FIG. 4 illustrates an example of a background skin set-up screen according to a video conversation partner, FIG. 5 illustrates various background skins which can be selected by a user, and FIGS. 6A and 6B illustrate examples of a screen to which a background skin selected by a user is applied.

As illustrated in FIG. 4, a user sets up a background skin to be applied according to a conversation partner registered in a phonebook on a phone number registration menu screen provided by a terminal.

More specifically, background skins may be denoted by a background skin number such as "background skin 01" and "background skin 02" as illustrated in FIG. 5, and stored in a user terminal. This allows the user to set up a desired background skin for a conversation partner by selecting its number.

After the user sets up background skins for respective conversation partners as described above, when a person whose background skin is set up calls the user or is called by the user in order to have a video conversation, the background skin selected by the user is applied as illustrated in FIGS. 6A and 6B, and a video conversation is enabled.

More specifically, as illustrated in FIG. 6A, while an image of a receiver superimposed upon a blank background skin is displayed on a screen of a caller's videophone, an image of the caller superimposed upon a background skin "back02" is displayed in a corner of the screen.

Similarly, as illustrated in FIG. 6B, the image of the caller superimposed upon the background skin "back02" is displayed on the screen of the receiver's videophone, and the image of the receiver superimposed upon the blank background skin is displayed in a corner of the screen.

In addition, when the caller wants to change the background skin during a video conversation to which the background skin is applied, the caller can select from among various background skins through the corresponding user menu screen and make the change to the selected background skin. Such a background skin changing process during a video conversation will be described in detail below with reference to FIG. 8.

Figure 7:
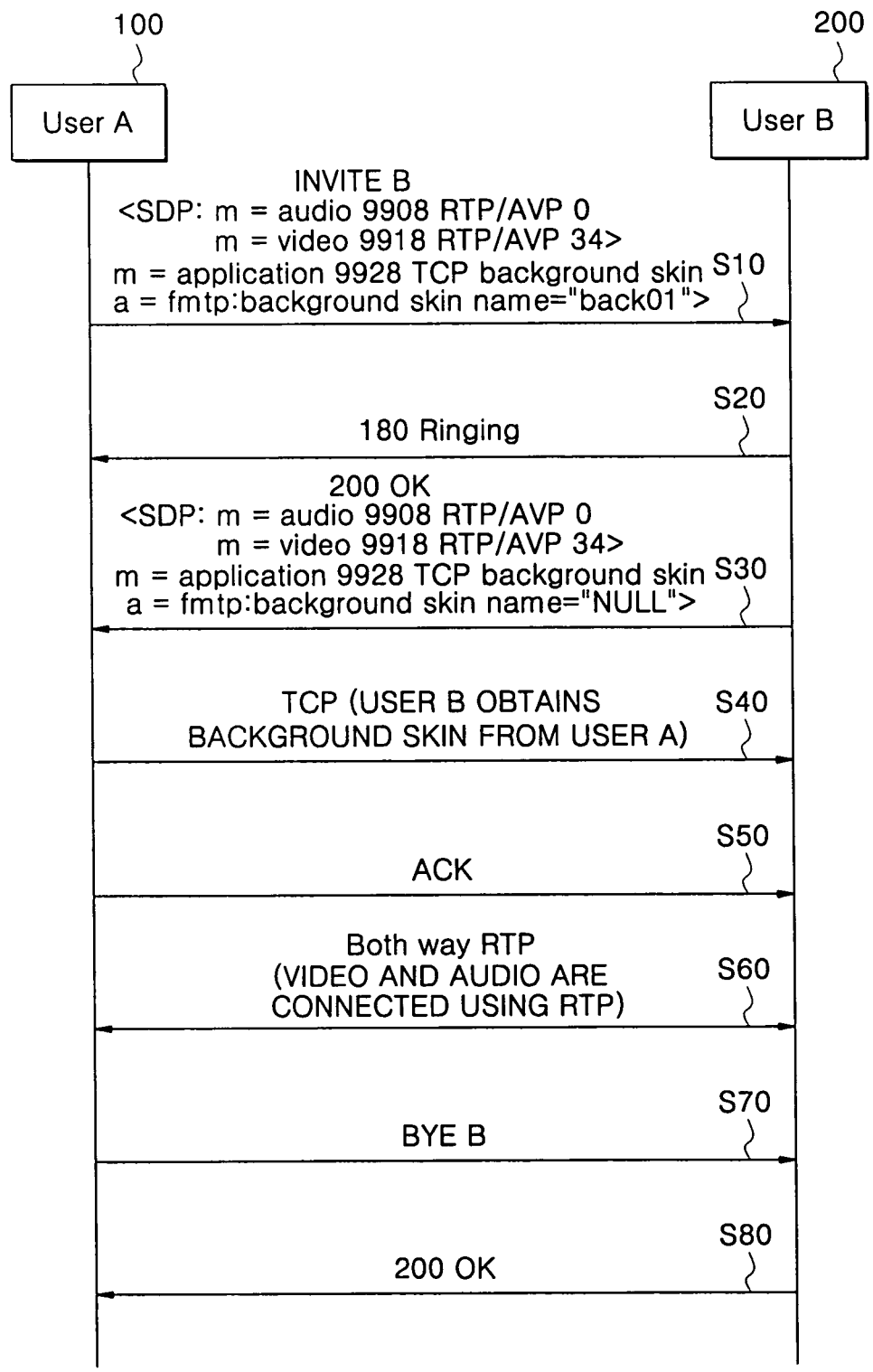
FIG. 7 is a diagram of call flow in which a background skin is applied according to an exemplary embodiment of the present invention.

FIG. 7 is a diagram of call flow in which a background skin is applied according to an exemplary embodiment of the present invention. The call flow will be described below by assuming that the first visual terminal 100 is the transmitting visual terminal and the second visual terminal 200 is the receiving visual terminal 200.

As illustrated in FIG. 7, the first visual terminal 100 sends the "INVITE B" message, which is a call request message, to the second visual terminal 200 (S10). In this respect, the SDP is defined as follows: <SDP: m=audio 9908 RTP/AVP 0 m=video 9918 RTP/AVP 34m=application 9928 TCP background skin a=fmtp:background skin name="back01">. It can be seen from the definition of the SDP that the caller selected a background skin "back01".

Subsequently, the second visual terminal 200 sends the "180 Ringing" message to the first visual terminal 100 (S20), and then sends the "200 OK" message to the first visual terminal 100 (S30). In the latter regard, the SDP is defined as follows: <SDP: m=audio 9908 RTP/AVP 0 m=video 9918 RTP/AVP 34 m=application 9928 TCP background skin a=fmtp:background skin name=NULL>.

It can be seen from the definition of the SDP that the receiver did not select any background skin.

In this case, the second visual terminal 200 receives the background skin "back01" transmitted using transmission control protocol (TCP) from the first visual terminal 100, and displays the received background skin on its screen (S40).

Subsequently, the first visual terminal 100 sends an "ACK" response message to the second visual terminal 200 (S50).

As a result, the first visual terminal 100 and the second visual terminal 200 are connected by the RTP (S60), and they are allowed to exchange audio/video with each other.

More specifically, the image of the receiver superimposed upon a blank background skin is displayed on the screen of the caller's videophone, and the image of the caller superimposed upon the background skin "back01" is displayed in a corner of the screen.

Similarly, the image of the caller superimposed upon the background skin "back01" is displayed on the screen of the receiver's videophone, and the image of the receiver superimposed upon the blank background skin is displayed in a corner of the screen.

Subsequently, when the video call between the first visual terminal 100 and the second visual terminal 200 is terminated, the first visual terminal 100 sends the "BYE B" message to the second visual terminal 200 (S70), and the second visual terminal 200 sends the "200 OK" message to the first visual terminal 100 (S80).

In particular, when the caller wants to change the background skin during the video conversation allowed by the call connection established between the first visual terminal 100 and the second visual terminal 200, the caller generates and sends a "reINVITE" message to the receiver. Here, an index of the background skin newly selected by the caller is appended to the SDP of the "reINVITE" message.

Figure 8:
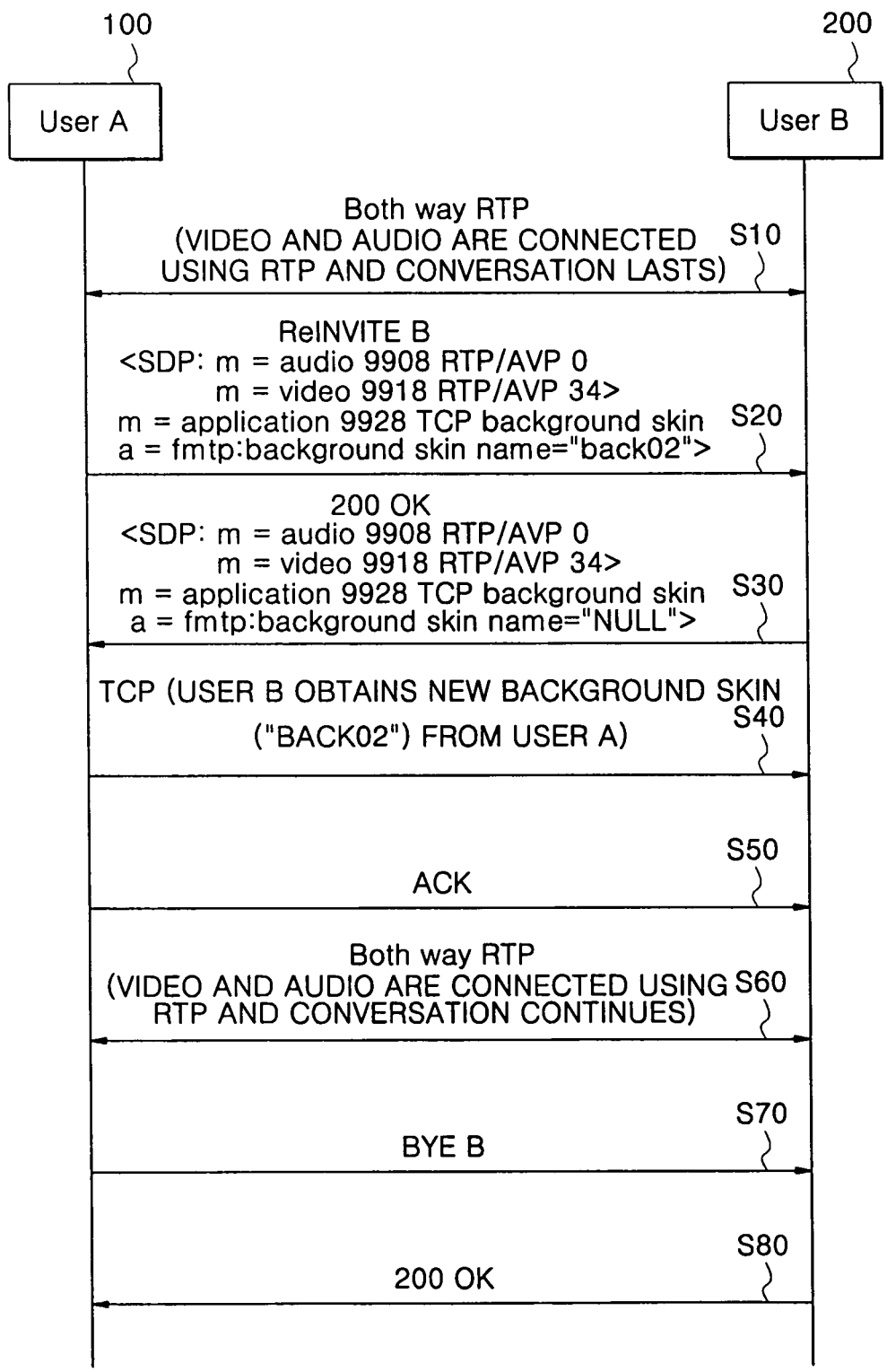
FIG. 8 is a diagram of call flow in a case wherein a background skin is changed during a video conversation according to an exemplary embodiment of the present invention.

FIG. 8 is a diagram of call flow in a case wherein a background skin is changed during a video conversation according to an exemplary embodiment of the present invention.

As illustrated in FIG. 8, when a caller wants to change a background skin during a video conversation allowed by a process in which the first visual terminal 100 and the second visual terminal 200 are connected by the RTP (S10) and transmit and receive audio/video, the first visual terminal 100 sends a "reINVITE B" message to the second visual terminal (S20). In this respect, the SDP is defined as follows: <SDP: m=audio 9908 RTP/AVP 0 m=video 9918 RTP/AVP 34 m=application 9928 TCP background skin a=fmtp:background skin name="back02">.

The second visual terminal 200 then sends the "200 OK" message to the first visual terminal 100 (S30). In this regard, the SDP is defined as follows: <SDP: m=audio 9908 RTP/AVP 0 m=video 9918 RTP/AVP 34 m=application 9928 TCP background skin a=fmtp:background skin name=NULL>.

As a result, the second visual terminal 200 receives a background skin "back02", transmitted using the TCP, from the first visual terminal 100 (S40).

Subsequently, the first visual terminal 100 sends an "ACK" response message to the second visual terminal (S50).

As a result, the first visual terminal 100 and the second visual terminal 200 are connected by the RTP, and are allowed to transmit and receive audio/video, thereby allowing the conversation to continue (S60).

More specifically, the image of the receiver superimposed upon a blank background skin is displayed on the screen of the caller's videophone, and an image of the caller superimposed upon the new background skin "back02" is displayed in a corner of the screen.

Similarly, the image of the caller superimposed upon the background skin "back02" is displayed on the screen of the receiver's videophone, and the image of the receiver superimposed upon the blank background skin is displayed in a corner of the screen.

Subsequently, when the video call between the first visual terminal 100 and the second visual terminal 200 is terminated, the first visual terminal 100 sends a "BYE B" message which informs the second visual terminal 200 of the call termination (S70), and the second visual terminal 200 sends the "200 OK" message to the first visual terminal 100 (S80).

According to the present invention, during a video call using Internet protocol (IP), moving picture data and a background skin are not mixed and transmitted, but rather they are separately transmitted, so that no additional hardware for data mixing is required in a terminal.

In addition, during a video call, not only are the images of the call participants displayed, but also the more visually appealing combination of their images superimposed upon background skins is displayed, thus making the video call more interesting and personalized.

In addition, a service provider can provide users with various background skins, thereby obtaining benefit from providing the additional service.

While the present invention has been described with reference to exemplary embodiments thereof, it will be understood by those skilled in the art that various changes in form and detail may be made therein without departing from the scope of the present invention as defined by the following claims.

What is claimed is:

1. A method for applying a background skin in a video call service, the method comprising:
transmitting, by a first terminal to a second terminal, a call request message comprising first background skin index information;
transmitting, by the second terminal to the first terminal, a response message comprising second background skin index information in response to the received call request message;
receiving and displaying, separately at the first terminal and the second terminal, background skin data associated with the first background skin index information, the background skin data being transmitted between the first terminal and the second terminal; and
displaying, together with the background skin data on the first terminal and the second terminal, multimedia data transmitted and received during a session established between the first terminal and the second terminal, the background skin data and the multimedia data being transmitted and received separately without being mixed with one another,
wherein displaying the multimedia data comprises superimposing the multimedia data on the background skin data such that the background skin data is displayed as a background to the superimposed multimedia data.

2. The method of claim 1, wherein the first background skin index information is included in the call request message comprising one of audio data information and video data information.

3. The method of claim 1, wherein the background skin data is set up and stored in a phonebook of each of the first terminal and the second terminal according to each of a plurality of contacts.

4. The method of claim 1, wherein the background skin data is transmitted between the first terminal and the second terminal using a transmission control protocol (TCP).

5. The method of claim 1, wherein when the background skin data is to be changed, displaying multimedia data together with the background skin data further comprises:
transmitting a second request message comprising index information of a new background skin data; and
receiving, from the second terminal, a second response message at the first terminal.

6. The method of claim 5, further comprising displaying, separately at the first terminal and the second terminal, the new background skin data transmitted between the first terminal and the second terminal.

7. The method of claim 6, further comprising displaying multimedia data transmitted and received between the first terminal and the second terminal, together with the new background skin data displayed on each terminal.

8. A method for applying a background skin in a video call service, the method comprising:
displaying multimedia data transmitted and received during a session established between a first terminal and a second terminal, together with a background skin displayed on the first terminal and the second terminal, the background skin and the multimedia data being transmitted and received separately without being mixed with one another;
transmitting a request message comprising index information of a new background skin;
receiving, from the second terminal, a response message at the first terminal;
displaying, separately at the first terminal and the second terminal, the new background skin transmitted between the first terminal and the second terminal; and
displaying, together with the new background skin on the first terminal and the second terminal, multimedia data transmitted and received between the first terminal and the second terminal, the new background skin and the multimedia data being transmitted and received separately without being mixed with one another,
wherein displaying the multimedia data comprises superimposing the multimedia data on the background skin such that the background skin is displayed as a background to the superimposed multimedia data.

9. The method of claim 8, wherein the index information of the new background skin is included in the request message comprising one of audio data information and video data information.

10. The method of claim 8, wherein the new background skin transmitted between the first terminal and the second terminal is transmitted using a transmission control protocol (TCP).

11. A method for applying a background skin in a video call service, the method comprising:
transmitting, by a first terminal to a second terminal, a call request message comprising background skin index information;

transmitting, by the second terminal to the first terminal, a response message comprising blank background skin index information, in response to the received call request message;

receiving and displaying background skin data associated with the background skin index information, the background skin data being transmitted from the first terminal to the second terminal; and displaying, on the second terminal together with the background skin data, multimedia data transmitted from the first terminal during a session established between the first terminal and the second terminal, the background skin data and the multimedia data being transmitted and received separately without being mixed with one another, wherein displaying the multimedia data comprises superimposing the multimedia data on the background skin data such that the background skin data is displayed as a background to the superimposed multimedia data.

12. The method of claim 11, wherein the background skin index information is included in the call request message comprising one of audio data information and video data information.

13. The method of claim 11, wherein the background skin data is set up and stored in a phonebook of the first terminal according to each of a plurality of contacts.

14. The method of claim 11, wherein the background skin data is transmitted from the first terminal to the second terminal using a transmission control protocol (TCP).

15. The method of claim 11, wherein when the background skin data is to be changed, displaying multimedia data together with the background skin data further comprises transmitting a second request message comprising index information of a new background skin data, to the second terminal.

16. The method of claim 15, further comprising receiving and displaying, at the second terminal, the new background skin data transmitted from the first terminal.

17. The method of claim 16, further comprising displaying multimedia data transmitted from the first terminal, together with the new background skin data displayed on the second terminal.

18. A wireless terminal, comprising:
a display unit; and
a transceiver to receive a response message comprising second background skin index information, the response message being received in response to transmission of a call request message comprising first background skin index information;

wherein, in response to the transceiver receiving background skin data associated with the second background skin index information, the display unit displays the background skin data together with multimedia data transmitted over an established session, the background skin data and the multimedia data being transmitted and received separately without being mixed with one another, and wherein the multimedia data is superimposed on the background skin data such that the background skin data is displayed as a background to the superimposed multimedia data.

19. The wireless terminal of claim 18, wherein the background skin index information is included in the call request message comprising one of audio data information and video data information.

20. The wireless terminal of claim 18, wherein the background skin data is set up and stored in a phonebook of the wireless terminal according to each of a plurality of contacts.

21. The wireless terminal of claim 18, wherein the background skin data is transmitted using a transmission control protocol (TCP).

22. The wireless terminal of claim 18, wherein when the background skin data is to be changed while the multimedia data together with the background skin data is displayed, the wireless terminal receives a second response message comprising fourth background skin index information in response to transmission of a second request message comprising third background skin index information, and in response to receiving new background skin data associated with the fourth background skin index information, the wireless terminal displays multimedia data together with the new background skin data.

* * * * *